United States Patent
Liu et al.

(10) Patent No.: US 10,121,495 B2
(45) Date of Patent: Nov. 6, 2018

(54) MAGNETIC RECORDING WRITE APPARATUS HAVING A STEPPED CONFORMAL TRAILING SHIELD

(71) Applicant: WESTERN DIGITAL (FREMONT), LLC, Fremont, CA (US)

(72) Inventors: Feng Liu, San Ramon, CA (US); Zhanjie Li, Pleasanton, CA (US); Zhigang Bai, Irvine, CA (US); Yi Wang, Mountain View, CA (US)

(73) Assignee: WESTERN DIGITAL (FREMONT), LLC, San Jose, CA (US)

( * ) Notice: Subject to any disclaimer, the term of this patent is extended or adjusted under 35 U.S.C. 154(b) by 0 days.

(21) Appl. No.: 15/677,145

(22) Filed: Aug. 15, 2017

(65) Prior Publication Data

US 2018/0025745 A1     Jan. 25, 2018

Related U.S. Application Data

(63) Continuation of application No. 14/953,982, filed on Nov. 30, 2015, now Pat. No. 9,754,611.

(51) Int. Cl.
| | |
|---|---|
| *G11B 5/11* | (2006.01) |
| *G11B 5/23* | (2006.01) |
| *G11B 5/31* | (2006.01) |
| *G11B 5/127* | (2006.01) |

(52) U.S. Cl.
CPC .............. *G11B 5/3116* (2013.01); *G11B 5/11* (2013.01); *G11B 5/1278* (2013.01); *G11B 5/23* (2013.01); *G11B 5/3146* (2013.01); *G11B 5/315* (2013.01)

(58) Field of Classification Search
None
See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |

(Continued)

OTHER PUBLICATIONS

Non-Final Office Action issued on U.S. Appl. No. 14/953,982, dated Oct. 5, 2016.

(Continued)

*Primary Examiner* — Craig A. Renner
(74) *Attorney, Agent, or Firm* — Foley & Lardner LLP (57) ABSTRACT

A magnetic write apparatus has a media-facing surface (MFS), a pole having leading and trailing surfaces, a trailing shield having a pole-facing surface, a write gap and coil(s). The pole's trailing surface has a portion adjoining the MFS and oriented at a nonzero, acute bevel angle from a direction perpendicular to the MFS. The pole-facing surface includes a first portion adjoining the MFS and oriented at a first angle substantially the same as the bevel angle, a second portion oriented at a second angle greater than the first trailing shield angle, and a third portion oriented at a third angle substantially the same as the first angle. The write gap has first, second and third thicknesses adjacent to the first, second and third portions of the pole-facing surface, respectively. The first thickness is constant. The second thickness varies. The third thickness is constant and greater than the first thickness.

16 Claims, 6 Drawing Sheets

(56) References Cited

U.S. PATENT DOCUMENTS

| | | |
|---|---|---|
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank et al. |
| 6,304,414 B1 | 10/2001 | Crue et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank et al. |
| 6,417,998 B1 | 7/2002 | Crue et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue et al. |
| 6,466,404 B1 | 10/2002 | Crue et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |

(56) References Cited

U.S. PATENT DOCUMENTS

| | | |
|---|---|---|
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,070,698 B2 | 7/2006 | Le |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |

(56) References Cited

U.S. PATENT DOCUMENTS

| | | |
|---|---|---|
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,464,457 B2 | 12/2008 | Le et al. |
| 7,477,481 B2 | 1/2009 | Guthrie et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,715,147 B2 | 5/2010 | Feldbaum et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,978,430 B2 | 7/2011 | Le et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,054,586 B2 | 11/2011 | Balamane et al. |
| 8,065,788 B2 | 11/2011 | Guruz et al. |
| 8,066,892 B2 | 11/2011 | Guthrie et al. |
| 8,066,893 B2 | 11/2011 | Baer et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,108,986 B2 | 2/2012 | Liu |
| 8,116,043 B2 | 2/2012 | Leng et al. |
| 8,116,171 B1 | 2/2012 | Lee |
| 8,125,732 B2 | 2/2012 | Bai et al. |
| 8,125,856 B1 | 2/2012 | Li et al. |
| 8,134,794 B1 | 3/2012 | Wang |
| 8,134,802 B2 | 3/2012 | Bai et al. |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,078 B1 | 11/2012 | Zeltser et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,737 B2 | 12/2012 | Mino et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |

(56) References Cited

U.S. PATENT DOCUMENTS

| | | |
|---|---|---|
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,379,347 B2 | 2/2013 | Guan et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,468,683 B2 | 6/2013 | Mao et al. |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,660 B2 | 10/2013 | Allen et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,570,686 B2 | 10/2013 | Hosomi et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,210 B2 | 7/2014 | De La Fuente et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,828,248 B2 | 9/2014 | Mao et al. |
| 8,873,201 B2 | 10/2014 | Benakli et al. |
| 8,929,029 B2 | 1/2015 | Min et al. |
| 8,988,824 B1 | 3/2015 | Brinkman et al. |
| 9,030,776 B1 | 5/2015 | Sasaki et al. |
| 9,042,051 B2 | 5/2015 | Zeng et al. |
| 9,082,423 B1 | 7/2015 | Liu et al. |
| 9,361,912 B1 | 6/2016 | Liu et al. |
| 2009/0268344 A1 | 10/2009 | Guan et al. |
| 2009/0310244 A1 | 12/2009 | Shimazawa et al. |
| 2010/0290157 A1 | 11/2010 | Zhang et al. |

(56) References Cited

U.S. PATENT DOCUMENTS

| | | |
|---|---|---|
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |
| 2014/0326699 A1 | 11/2014 | Hsiao et al. |
| 2015/0002963 A1 | 1/2015 | Tian et al. |
| 2015/0170679 A1 | 6/2015 | Sasaki et al. |
| 2015/0170682 A1 | 6/2015 | Sasaki et al. |

OTHER PUBLICATIONS

Notice of Allowance on U.S. Appl. No. 14/953,982 dated May 15, 2017.

Prior Art
ABS View

MAGNETIC RECORDING WRITE APPARATUS HAVING A STEPPED CONFORMAL TRAILING SHIELD

CROSS-REFERENCE TO RELATED APPLICATIONS

This application is a continuation of U.S. application Ser. No. 14/953,982, filed Nov. 30, 2015 the entirety of which is incorporated by reference herein.

BACKGROUND

Figure 1A:
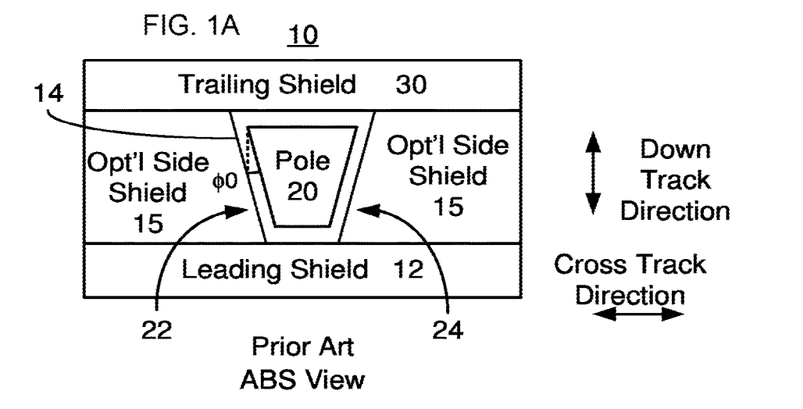
FIGS. 1A-1B depict ABS and side views of a conventional magnetic recording apparatus.
Figure 1B:
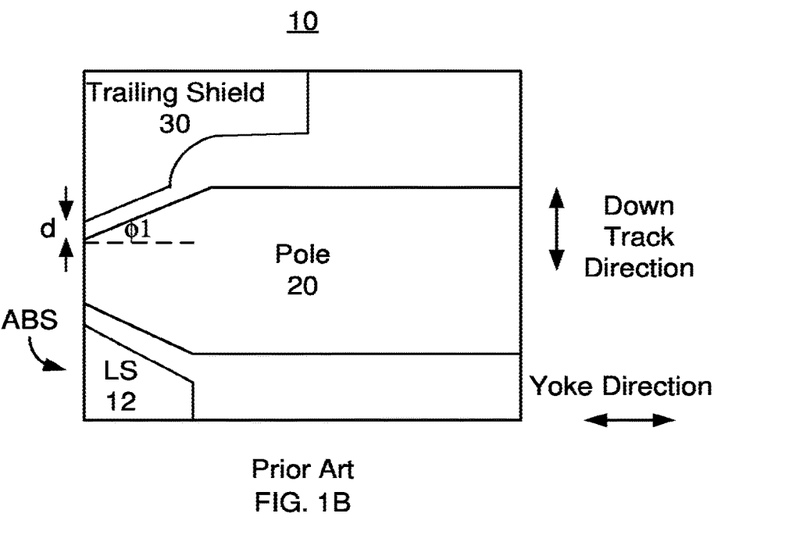

FIGS. 1A and 1B depict ABS and side views of a conventional magnetic recording apparatus 10. The magnetic recording apparatus 10 may be a perpendicular magnetic recording (PMR) apparatus or other magnetic write apparatus. The conventional magnetic recording apparatus 10 may be a part of a merged head including the write apparatus 10 and a read apparatus (not shown). Alternatively, the magnetic recording head may only include the write apparatus 10.

The write apparatus 10 includes a leading shield 12, a nonmagnetic gap layer 14, optional side shield(s) 15, a pole 20 and a trailing shield 30. The apparatus 10 may also include other components including but not limited to coils for energizing the pole 20. The pole 20 includes sidewalls 22 and 24 that form an angle φ0 with the down track direction at the ABS. The trailing surface (top) of the pole 20 is wider than the leading surface (bottom) of the pole 20. The top (trailing) surface of the pole 20 also has a bevel angle φ1 with the yoke direction. Thus, a write gap of constant width, d, is formed between the trailing shield 30 and the pole 20. At some distance in, however, the trailing shield 30 rapidly increases in distance from the pole 20.

Although the conventional magnetic recording apparatus 10 functions, there are drawbacks. In particular, the conventional magnetic write apparatus 10 may not perform sufficiently at higher recording densities. For example, the conventional write apparatus 10 may be subject to increased wide area track erasure (WATER) issues. In particular, the field from the pole 20 during writing to a track may disturb data recorded on other tracks. This is undesirable. Accordingly, what is needed is a system and method for improving the performance of a magnetic recording write apparatus 10.

DETAILED DESCRIPTION OF THE PREFERRED EMBODIMENTS

While the various embodiments disclosed are applicable to a variety of data storage devices such as magnetic recording disk drives, solid-state hybrid disk drives, networked storage systems etc., for the sake of illustration the description below uses disk drives as examples.

Figure 2A:
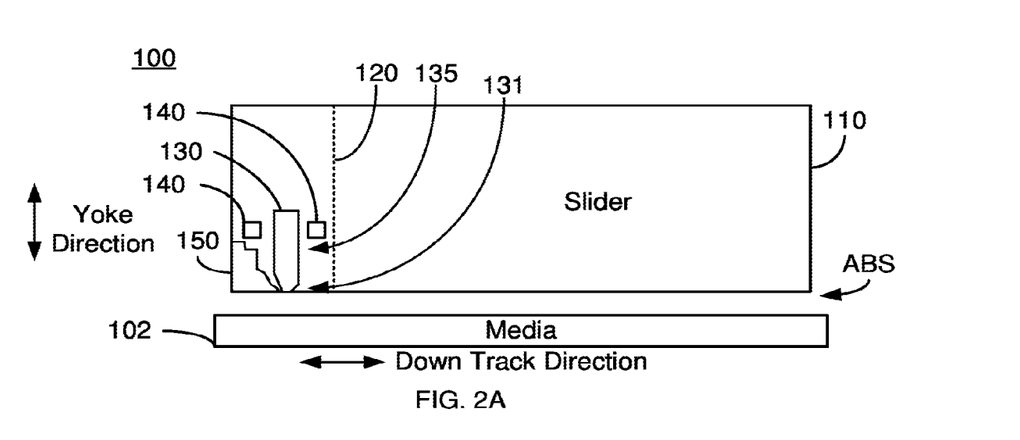
FIGS. 2A, 2B and 2C depict side, close-up side and ABS views of an exemplary embodiment of a magnetic recording disk drive.
Figure 2B:
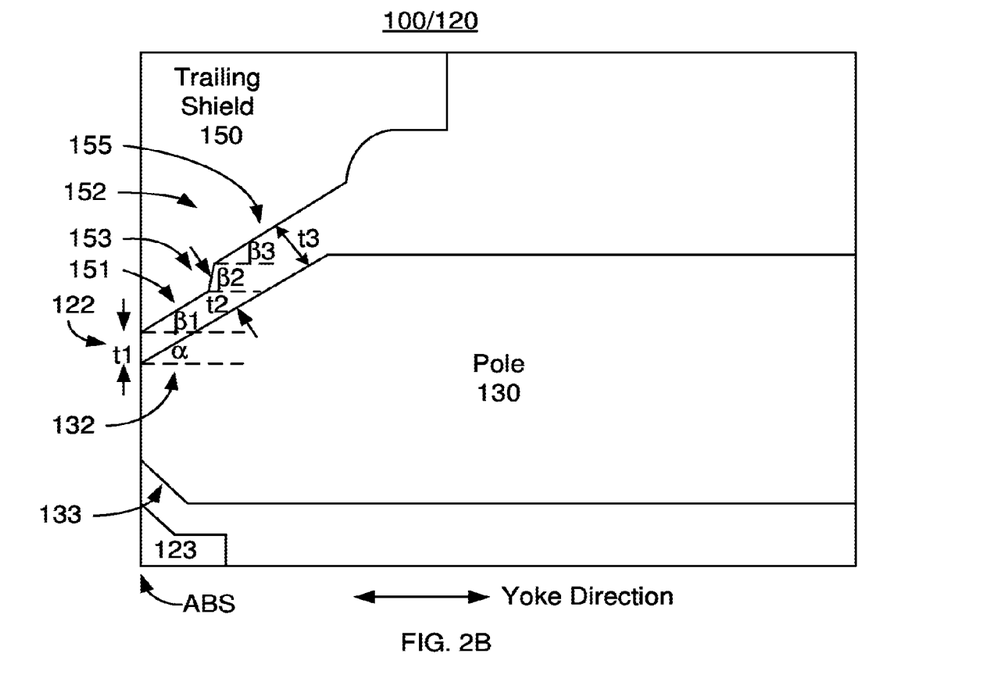
Figure 2C:
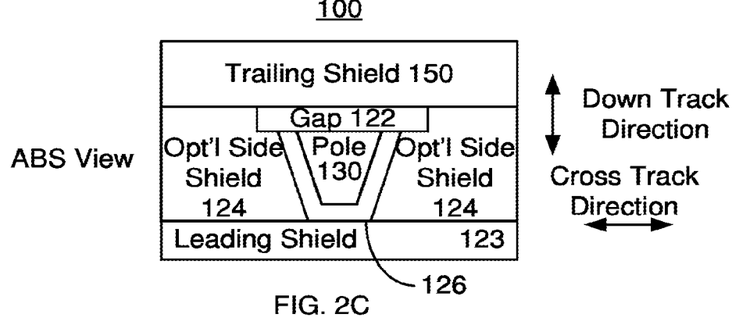

FIG. 2A, 2B and 2C depicts side, close-up apex and ABS views of an exemplary embodiment of a portion of a disk drive 100 including a write apparatus 120. For clarity, FIGS. 2A, 2B and 2C are not to scale. For simplicity not all portions of the disk drive 100 and apparatus 120 are shown. In addition, although the disk drive 100 and write apparatus 120 are depicted in the context of particular components other and/or different components may be used. For example, circuitry used to drive and control various portions of the disk drive 100 is not shown. For simplicity, only single components are shown. However, multiples of each components and/or and their sub-components, might be used. The disk drive 100 may be a PMR disk drive. However, in other embodiments, the disk drive 100 may be configured for other types of magnetic recording.

The disk drive 100 includes media 102, a slider 110 and a write apparatus 120. The write apparatus 120 is fabricated on the slider 110 and includes a media-facing surface (MFS). In the embodiment shown, the MFS is an air-bearing surface (ABS) that is proximate to the media 102 during use. Although not shown, the slider 110 and thus the apparatus 120 are generally attached to a suspension (not shown). In general, the disk drive 100 includes a write apparatus 120 and a read apparatus (not shown). However, for clarity, only the write apparatus 120 is shown. The write apparatus 120 includes a pole 130, coils 140, write gap 122 and trailing shield 150. The apparatus may also include a leading shield 123, optional side shields 124, and side/bottom gap 126. Multiple structures on which the leading shield 123 and pole 130 are fabricated may reside below the components shown. At least part of the side/bottom gap 126 is nonmagnetic and, in some embodiments, includes a seed layer for the pole. As discussed above, portions of the components 122, 123, 124, 126, 130, 140 and 150 may include multiple layers. In other embodiments, different and/or additional components may be used in the write apparatus 120.

The coil(s) 140 are used to energize the pole 130. Two turns 140 are depicted in FIG. 2A. Another number of turns may, however, be used. Note that only a portion of the coil(s) 140 is shown in FIG. 2A. Additional turns and/or additional layers of coils may be used. If, for example, the coil(s) 140 form a spiral, or pancake, coil, then additional portions of the coil(s) 140 may be located further from the ABS. The coil(s) 140 may also be a helical coil.

The pole 130 includes a pole tip region 131 close to the ABS and a yoke region 135 recessed from the ABS. The pole tip region 131 includes sidewalls in the cross track direction. The sidewalls are generally configured such that the pole 130 has a bottom and a top wider than the bottom. The pole tip region 131 is shown as having bottom/leading surface 133 and a top/trailing surface 132. In the embodiment shown, both the leading surface 133 and the trailing surface 132 are beveled. For example, the trailing surface 132 is at a bevel angle, α, with respect to a normal to the ABS.

The trailing surface 132 of the pole 130 is opposite to the leading surface 133 and faces the trailing shield 150. Because of the bevel, the trailing surface 132 is oriented at a bevel angle, α, from the yoke direction (perpendicular to the ABS). This first portion 132 of the trailing surface also adjoins the ABS. The bevel angle is an acute angle, as shown in FIG. 2B. In some embodiments, the bevel angle is at least fifteen degrees and not more than forty degrees. In some such embodiments, the bevel angle is at least twenty-two degrees and not more than twenty-eight degrees.

The trailing shield 150 has a pole-facing surface 152 which faces the trailing surface of the pole 130. The pole-facing surface 152 has three portions 151, 153 and 155. In the embodiment shown, the portions 151, 153 and 155 adjoin. However, in other embodiments, the pole-facing surface 152 may include other features between the portions 151, 153 and 155.

The first portion 151 of the pole-facing surface 152 adjoins the ABS and is at a first trailing shield angle, β1, from the yoke direction at the ABS. In some embodiments, the first portion 151 of the pole-facing surface 152 extends at least twenty nanometers and not more than one hundred nanometers from the ABS. In some such embodiments, the first portion 151 of the pole-facing surface 152 extends at least forty and not more than sixty nanometers from the ABS. For example, the first portion 151 may extend nominally seventy nanometers from the ABS. In the embodiment shown, the first trailing shield angle is substantially the same as the bevel angle (β1≈α). As a result, the write gap 122 has a first, constant thickness, t1, between the first portion 151 of the pole-facing surface 152 and trailing surface 132 of the pole 130. The write gap 122 thickness t1 may not exceed twenty-five nanometers in some embodiments. However, other thicknesses are possible.

The second portion 153 of the pole-facing surface 152 is oriented at a second trailing shield angle, β2. The second trialing shield angle is greater than the first trailing shield angle (β2>β1). Thus, the write gap 122 has a second thickness, t2 between the second portion 153 of the pole-facing surface 152 and the trialing surface 132 of the pole 130. The second thickness is variable. In some embodiments, the second trailing shield angle is at least forty-five degrees and not more than eighty-five degrees. In some embodiments, the second trailing shield angle is at least sixty degrees and not more than seventy-five degrees. In both such embodiments, however, the second trailing shield angle is greater than the first trailing shield angle.

The third portion 155 of the pole-facing surface 152 is oriented at a third trailing shield angle, β3, substantially the same as the first trailing shield angle (β3~β1). As can be seen in FIG. 2B, the second portion 153 of the pole-facing surface 152 is between the first portion 151 and the third portion 155. Thus, the write gap 122 has a substantially constant thickness t1, then an increasing thickness t2 followed by a substantially constant thickness t3 with increasing distance from the ABS in the yoke direction. The thickness t2 thus varies between t1 and t3. In some embodiments, the thickness t2 increases monotonically. The t3 may be at least fifteen nanometers greater than t1 and not more than fifty nanometers greater than t1 (t1+15 nm≤t2≤t1+50 nm). In some such embodiments, the t3 is at least twenty nanometers greater than t1 and not more than thirty nanometers greater than t1 (t1+20 nm≤t2≤t1+30 nm). However, other thicknesses are possible.

The magnetic disk drive 100 may exhibit improved performance. Because the width t1 of the gap 122 is constant near the ABS, the field produced by the magnetic apparatus 120 is relatively constant between different heads. Further, the magnitude of the field may be substantially maintained while mitigating wide area track erasure (WATER) issues. Near the ABS, the write gap 122 may remain small. Thus, a sufficiently high magnetic field and desired field magnetic profile may be maintained. The configuration of the pole 130 and trailing shield 150 allow for reduced shunting of the field by the trailing shield 150 because of the increase in thickness of the write gap 122 from t1 to t2 and t3 relatively close to the ABS. Because the increase in thickness of the write gap 122 is limited close to the ABS by limitations on the thickness t3, the trailing shield 150 may maintain sufficient volume to more effectively shield other tracks from the write field of the pole 130. Thus, performance of the disk drive 100 and write apparatus 120 may be improved.

Figure 3:
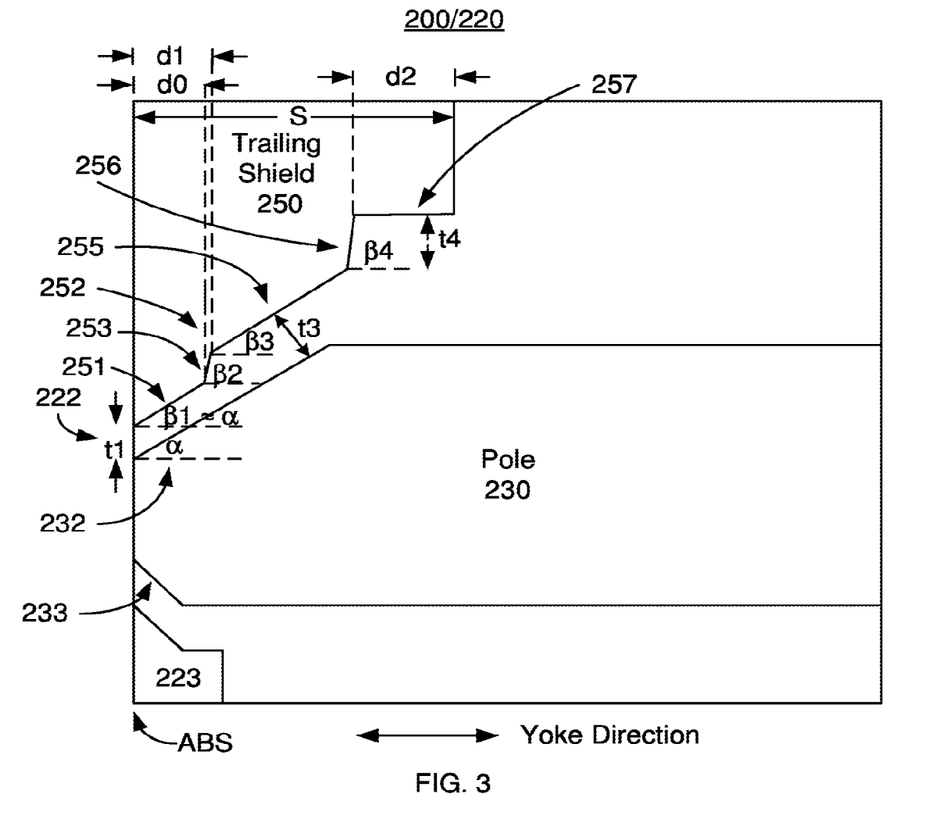
FIG. 3 depicts a side view of another exemplary embodiment of a magnetic recording apparatus.

FIG. 3 depicts a side view of another exemplary embodiment of a magnetic recording apparatus 220 that may be used in a data storage device 200. For clarity, FIG. 3 is not to scale. For simplicity not all portions of the write apparatus 220 are shown. The data storage device 200 may but need not be a disk drive. The magnetic write apparatus 220 is analogous to the write apparatus 120 and may be used in the magnetic disk drive 100. Thus, analogous components have similar labels. Further, as the ABS view of the apparatus 220 is analogous to that of the apparatus 120, only an apex view is shown. Thus, the write apparatus 220 includes a write gap 222, a leading shield 223, a pole 230 and a trailing shield 250 that are analogous to the write gap 122, the leading shield 123, the pole 130 and the trailing shield 150, respectively.

The pole 230 has a beveled leading surface 233 and a trailing surface 232 analogous to the leading surface 133 and trailing surface 132, respectively. The trailing surface is beveled at an angle, α, from the yoke direction. In some embodiments, the bevel angle is at least fifteen degrees and not more than forty degrees. In some such embodiments, the bevel angle is at least twenty-two degrees and not more than twenty-eight degrees. The write gap 222 has thicknesses t1, t2 and t3 that are analogous to those described above.

The trailing shield 250 has a pole-facing surface 252 which faces the trailing surface 232 of the pole 230. The pole-facing surface 252 has three portions 251, 253 and 255 that are analogous to the portions 151, 153 and 155 of the pole-facing surface 152. In the embodiment shown, the portions 251, 253 and 25 adjoin. However, in other embodiments, the pole-facing surface 252 may include other features between the portions 251, 253 and 255.

The first portion 251 of the pole-facing surface 252 adjoins the ABS and is at a first trailing shield angle, β1, from the yoke direction at the ABS. In some embodiments, the first portion 251 of the pole-facing surface 252 extends a distance d0 from the ABS that is analogous to that described above for the first portion 151 of the pole-facing surface 152. Thus, d0 may be at least twenty nanometers and not more than one hundred nanometers. In some such embodiments, d0 may be at least forty and not more sixty nanometers. The first trailing shield angle is substantially the same as the first bevel angle (β1≈α). The second portion 253 of the pole-facing surface 252 is oriented at a second trailing shield angle, β2. The second trialing shield angle is greater than the first trailing shield angle (β2>β1). In some embodiments, the second trailing shield angle is at least forty-five degrees and not more than eighty-five degrees. In some embodiments, the second trailing shield angle is at least sixty degrees and not more than seventy-five degrees. In both such embodiments, however, the second trailing shield angle is greater than the first trailing shield angle. The distance, d1, that the first and second portions of the pole-facing surface 252 extend from the ABS is desired to be less than the distance the bevel for the trailing surface 232 of the pole 230 extends. Stated differently, d1<trailing bevel depth. The third portion 255 of the pole-facing surface 252 is oriented at a third trailing shield angle, l33, substantially the same as the first trailing shield angle (β3≈β1). The second portion 253 of the pole-facing surface 252 is between the first portion 251 and the third portion 255. Thus, the write gap 222 has a substantially constant thickness t1, then an increasing thickness t2 followed by a substantially constant thickness t3 with increasing distance from the ABS in the yoke direction. As mentioned above, the values of the thicknesses t1, t2 and t3 for the write gap 222 are analogous to those for the write gap 122.

The pole-facing surface 252 of the trailing shield 250 also has a fourth portion 256 and a fifth portion 257. The fourth portion 256 is oriented at a fourth trailing shield angle, β4, from the yoke direction. The fifth portion 257 is perpendicular to the ABS. The fourth portion 256 of the pole-facing surface 252 adjoins the third portion 252. However, in other embodiments, additional portions of the pole-facing surface 252 may be between the third portion 255 and the fourth portion 256. The fourth trailing shield angle is at least forty-five degrees and not more than ninety degrees. The fourth trailing shield angle also exceeds the third trailing shield angle (β4>β3). Thus, the distance between the trailing shield 250 and the pole 230 increases rapidly in this region. In some embodiments, the trailing shield terminates 250 at a location recessed from the ABS that is at least one hundred nanometers and not more than four hundred nanometers in a yoke direction from the edge of the fourth portion 256 of the pole-facing surface 252 furthest from the ABS. Stated differently, d2 may be at least one hundred nanometers and not more than four hundred nanometers. In some embodiments, the trailing shield extends not more than six hundred nanometers from the ABS (S≤six hundred nanometers). In some such embodiments, the trailing shield may extend not more than four hundred nanometers from the ABS. In some such embodiments, the fourth portion 256 of the pole-facing surface 252 extends a distance t4 parallel to the ABS of at least fifteen nanometers and not more than one hundred nanometers. Stated differently, t4 is at least fifteen nanometers and not more than one hundred nanometers. In some such embodiments, t4 is least forty nanometers and not more than sixty nanometers.

The magnetic apparatus 220 may share the benefits of the apparatus 120 and disk drive 100. Because the width t1 of the gap 222 is constant near the ABS, the field produced by the magnetic apparatus 220 is relatively constant between different devices. Further, the magnitude of the field may be substantially maintained. The configuration of the pole 230 and trailing shield 250 allow for reduced shunting of the field by the trailing shield 250 while maintaining improved WATER due to the trailing shield 250. As a result, performance of the apparatus 220 may be improved.

Figure 4:
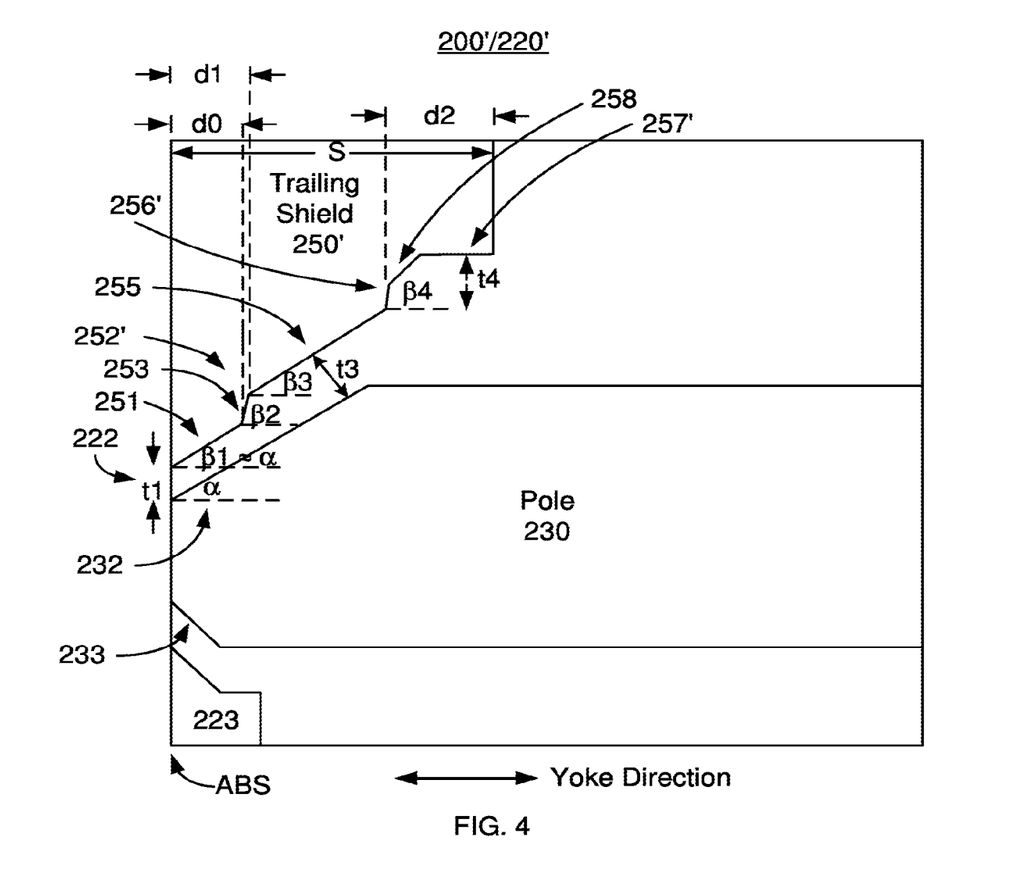
FIG. 4 depicts a side view of another exemplary embodiment of a magnetic recording apparatus.

FIG. 4 depicts a side view of another exemplary embodiment of a magnetic recording apparatus 220' that may be used in a data storage device 200'. For clarity, FIG. 4 is not to scale. The data storage device 200' may but need not be a disk drive. For simplicity not all portions of the apparatus 220' are shown. The magnetic recording apparatus 220' is analogous to the write apparatus 120 and/or 220 and may be used in the magnetic disk drive 100 and/or 200. Thus, analogous components have similar labels. Further, as the ABS view of the apparatus 220 is analogous to that of the apparatus 120, only a side view is shown. Thus, the write apparatus 220' includes a write gap 222, a leading shield 223, a pole 230 and a trailing shield 250' that are analogous to the write gap 122/222, the leading shield 123/223, the pole 130/230 and the trailing shield 150/250, respectively.

The beveled leading surface 233 and trailing surface 232 of the pole 230 are analogous to the beveled leading surface 133/233 and trailing surface 132/232 of the pole 130/230 depicted in FIGS. 2A-3. The bevel angle α, first trailing shield angle β1, second trailing shield angle β2, third trailing shield angle β3 and fourth trailing shield angle β4 are analogous to the angles trailing shield angle α, β1, β2, β3 and β4, respectively. The thicknesses t1, t2, t3 and t4 are analogous to the thicknesses t1, t2, t3 and t4, respectively, described previously. Similarly, the distances d0, d1, d2 and S are analogous to those described previously.

The trailing shield 250' has a pole-facing surface 252' which faces the trailing surface 232 of the pole 230. The pole-facing surface 252' has five portions 251, 253, 255, 256' and 257' that are analogous to the portions 151/251, 153/253, 155/255, 256 and 257 of the pole-facing surface 152/252, respectively. However, in the embodiment shown, the fourth portion 256' and fifth portion 257' of the pole-facing surface 252' are shorter and do not meet. Instead, a sixth portion 258 is between the fourth portion 256' and the fifth portion 257'. The sixth portion 258 is at an sixth trailing shield angle from the yoke direction that is smaller than β4.

The magnetic apparatus 220' may share the benefits of the apparatus 120/220 and disk drive(s) 100/200. Because the width of the gap 222 is constant near the ABS, the field produced by the magnetic apparatus 220 is relatively constant between different devices. Further, the magnitude of the field may be substantially maintained. The configuration of the pole 230 and trailing shield 250' allow for reduced shunting of the field by the trailing shield 250 while maintaining improved WATER due to the trailing shield 250'. In addition, the sixth portion 258 of the pole-facing surface 252' allows for a larger volume of the trailing shield 250'. As a result, more magnetic material may be present in the trialing shield 250'. Thus, the trailing shield 250' may be better able to shield the pole 230 and provide better WATER. As a result, performance of the apparatus 220' may be improved.

Figure 5:
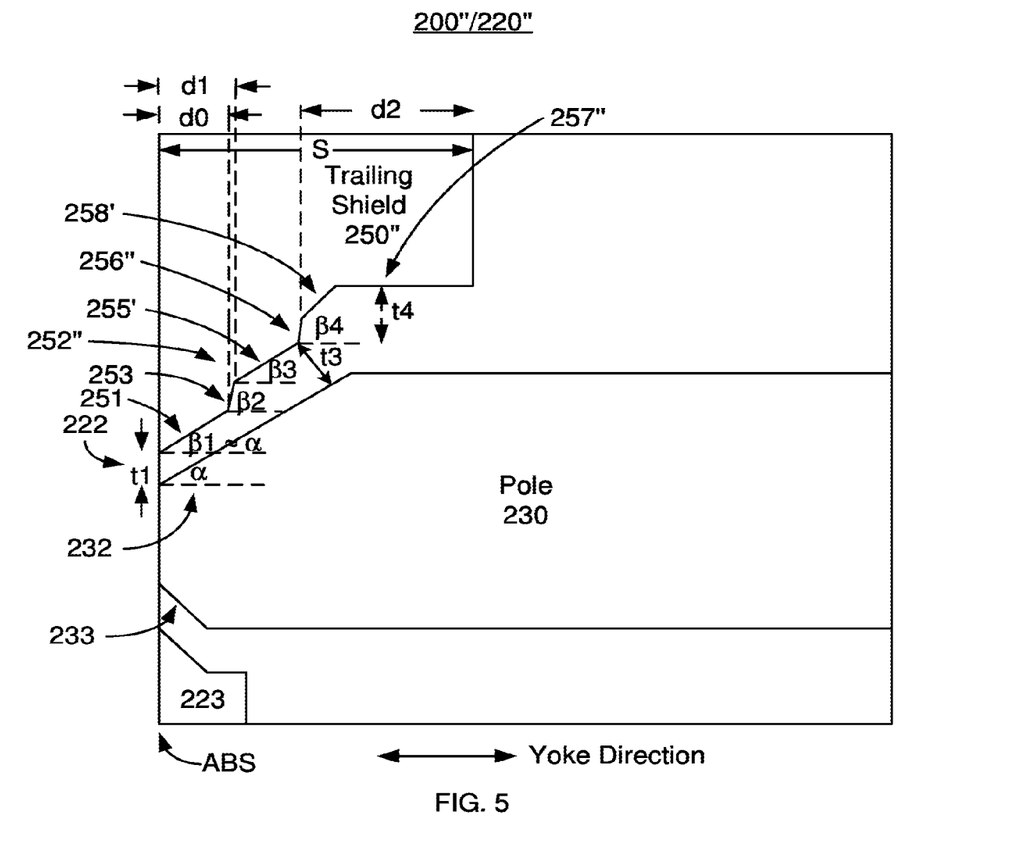
FIG. 5 depicts a side view of another exemplary embodiment of a magnetic recording apparatus.

FIG. 5 depicts a side view of another exemplary embodiment of a magnetic recording apparatus 220" that may be used in a data storage device 200". For clarity, FIG. 5 is not to scale. The data storage device 200" may but need not be a disk drive. For simplicity not all portions of the apparatus 220" are shown. The magnetic recording apparatus 220" is analogous to the write apparatus 120, 220 and/or 220' and may be used in the magnetic disk drive 100, 200 and/or 200'. Thus, analogous components have similar labels. Further, as the ABS view of the apparatus 220 is analogous to that of the apparatus 120, only a side view is shown. Thus, the write apparatus 220" includes a write gap 222, a leading shield 223, a pole 230 and a trailing shield 250" that are analogous to the write gap 122/222, the leading shield 123/223, the pole 130/230 and the trailing shield 150/250/250', respectively.

The beveled leading surface 233 and trailing surface 232 of the pole 230 are analogous to the beveled leading surface 133/233 and trailing surface 132/232 of the pole 130/230 depicted in FIGS. 2A-4. The bevel angle α, first trailing shield angle β1, second trailing shield angle β2, third trailing shield angle β3 and fourth trailing shield angle β4 are analogous to the angles trailing shield angle α, β1, β2, β3 and β4, respectively. The thicknesses t1, t2, t3 and t4 are analogous to the thicknesses t1, t2, t3 and t4, respectively, described previously. Similarly, the distances d0, d1, d2 and S are analogous to those described previously.

The trailing shield 250" has a pole-facing surface 252" which faces the trailing surface 232 of the pole 230. The pole-facing surface 252" has five portions 251, 253, 255', 256" and 257" that are analogous to the portions 151/251, 153/253, 155/255, 256/256' and 257/257' of the pole-facing surface 152/252/252', respectively. The portions 255', 256", 257" and 258' have different lengths than shown previously. In particular, the third portion 255' having third trailing shield angle β3 terminates closer to the ABS than the bevel for the trailing surface 232 of the pole 230 shown in FIG. 3. Thus, the constant width t3 of the write gap 222 terminates closer to the ABS than the bevel of the trailing surface 232 of the pole 230.

The magnetic apparatus 220" may share the benefits of the apparatus 120/220/220' and disk drive(s) 100/200/200'. Because the width of the gap 222 is constant near the ABS, the field produced by the magnetic apparatus 220 is relatively constant between different devices. Further, the magnitude of the field may be substantially maintained. The configuration of the pole 230 and trailing shield 250" allow for reduced shunting of the field by the trailing shield 250" while maintaining improved WATER due to the trailing shield 250'. Thus, the trailing shield 250" may be better able to shield the pole 230 and provide better WATER. As a result, performance of the apparatus 220" may be improved.

Various features of the write apparatus 120, 220, 220' and 220" are highlighted in the description herein. These features may be combined in manners not explicitly disclosed and which are not inconsistent with the method and apparatus described herein. Similarly, the trailing shield, write gap and pole are described in the context of various distances, in other embodiments, other distances might be used.

Figure 6:
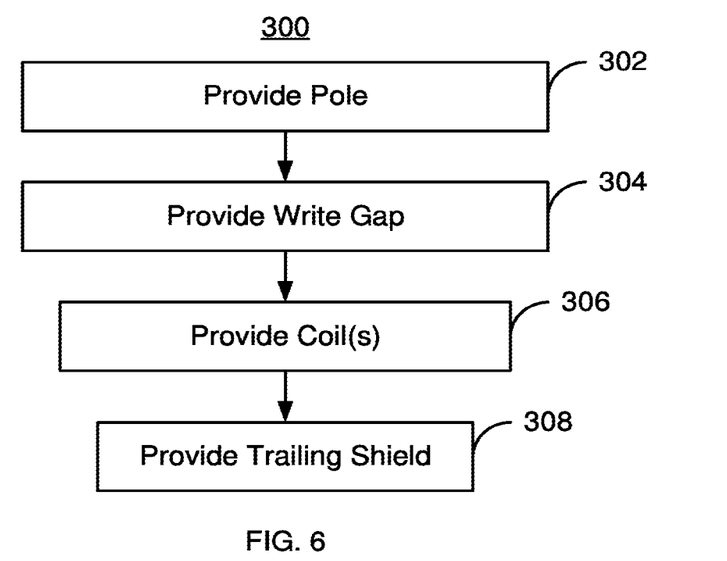
FIG. 6 is a flow chart depicting an exemplary embodiment of a method for providing magnetic recording apparatus.

FIG. 6 depicts an exemplary embodiment of a method 300 for providing a magnetic recording apparatus 120, 220, 220' and/or 220". For simplicity, some steps may be omitted, interleaved, combined and/or include substeps. The method 300 is also described in the context of providing a magnetic recording head 100 and apparatus 120 depicted in FIGS. 2A-2C. The method 300 may also be used to fabricate other magnetic recording apparatuses including but not limited to any combination of 220, 220' and/or 220". The method 300 may be used to fabricate multiple magnetic recording heads at substantially the same time. The method 300 is also described in the context of particular layers. A particular layer may include multiple materials and/or multiple sublayers. The method 300 also may start after formation of other portions of the magnetic recording head. For example, the method 300 may start after a read apparatus, return pole/leading shield and/or other structure have been fabricated.

Referring to FIGS. 2A-2C and 6, the pole 130 is provided, via step 302. Step 302 may include using one or more damascene processes. For example, a trench may be formed in a layer. The trench may be fabricated such that portions of the trench sidewalls form angles with the down track direction. The width of the trench may also vary to form pole tip and yoke regions. The trench may also be configured so that the beveled leading surface 133 is naturally formed as the trench is filled. The material(s) for the pole 130 deposited, for example via plating. One or more ferromagnetic materials may be used. The pole tip 131 and yoke 135 may be formed. In addition, the trailing surface 132 is formed. Formation of the trailing surface may include performing one or more ion beam etches. Other methods may also be used to form the pole 130 including but not limited to full film deposition of magnetic materials and removal for example via milling and/or lapping.

The write gap is provided, via step 304. Step 304 includes depositing a nonmagnetic material. One or more layers may be deposited in step 304. The material may be conformally deposited. In addition, portions of the write gap may be removed to provide the thicknesses t1, t2, t3 and t4.

The coil(s) 140 are provided, via step 306. Portions of step 306 may thus be interleaved with the remaining steps of the method 300. For example, portions of the coil 340 may be provided before the formation of the pole 130. However, other portions of the coil 140 may be provided after some or all of the pole 130 has been formed. Step 306 may also include depositing and patterning the material(s) used for the coil(s) 140. Step 306 may include forming one or more helical coils or one or more pancake/spiral coil. In such embodiments, a spiral coil 140 may include other turns far from the ABS.

The trailing shield 150 may be provided, via step 308. Step 308 may be performed such that multiple trailing shield angles, β1, β2, β3 and/or β4, are formed.

Using the method 300, the magnetic disk drive 100 and magnetic apparatuses 120, 220, 220' and/or 220" may be provided. Thus, the benefits of the magnetic apparatuses 120, 220, 220' and/or 220" may be achieved.

What is claimed is:

1. A magnetic write apparatus comprising:
a pole comprising a pole tip that occupies a portion of a media facing surface and a pole trailing surface of the pole tip extends from the media facing surface in a yoke direction at a pole bevel angle, wherein the yoke direction extends perpendicular to the media facing surface; and
a trailing shield adjacent to the pole trailing surface of the pole tip, wherein the trailing shield comprises a pole-facing surface comprising a first portion, a second portion, a third portion, a fourth portion, a fifth portion, and a sixth portion,
wherein the first portion extends from the media facing surface in the yoke direction at a first trailing shield angle that is substantially equal to the pole bevel angle;
wherein the second portion extends from the first portion in the yoke direction at a second trailing shield angle that is greater than the first trailing shield angle;
wherein the third portion extends from the second portion in the yoke direction at a third trailing shield angle that is substantially equal to the first trailing shield angle;
wherein the fourth portion extends from the third portion in the yoke direction at a fourth trailing shield angle that is greater than the third trailing shield angle;
wherein the fifth portion extends substantially parallel to the yoke direction away from the media facing surface; and
wherein the sixth portion extends between the fourth portion and the fifth portion.

2. The magnetic write apparatus of claim 1, wherein the sixth portion extends at a sixth trailing shield angle that is smaller than the fourth trailing shield angle.

3. The magnetic write apparatus of claim 1, wherein the pole trailing surface comprises a first trailing surface portion having the pole bevel angle and a second trailing surface portion extending substantially parallel to the yoke direction from the first trailing surface portion, wherein the first trailing surface portion extends to a first distance from the media facing surface, and wherein a combined width of the first portion, the second portion, and the third portion is less than the first distance.

4. The magnetic write apparatus of claim 1, wherein a write gap between the pole trailing surface and the pole-facing surface increases from the media facing surface in the yoke direction.

5. A magnetic write apparatus comprising:
a pole comprising a pole tip occupying a portion of a media facing surface and a yoke extending from the pole tip in a yoke direction that extends in a direction perpendicular to the media facing surface, wherein the pole tip comprises a pole trailing surface having a first trailing surface portion that extends to a first distance from the media facing surface in the yoke direction at a pole bevel angle; and a trailing shield adjacent to the pole trailing surface of the pole tip, wherein the trailing shield comprises a pole-facing surface of the trailing shield facing the pole trailing surface, and wherein the pole-facing surface comprises a first portion, a second portion, and a third portion extending in the yoke direction, wherein the third portion extends beyond the first distance in the yoke direction, wherein the first portion of the pole-facing surface extends from the media facing surface in the yoke direction at a first trailing shield angle that is substantially equal to the pole bevel angle, wherein the second portion of the pole-facing surface extends from the first portion in the yoke direction at a second trailing shield angle that is greater than the first trailing shield angle; and wherein the third portion of the pole-facing surface extends from the second portion in the yoke direction at a third trailing shield angle that is substantially equal to the first trailing shield angle, wherein the pole-facing surface further comprises a fourth portion that extends from the third portion in the yoke direction at a fourth trailing shield angle that is greater than the third trailing shield angle and a fifth portion that extends in the yoke direction substantially perpendicular to the media facing surface.

6. The magnetic write apparatus of claim 5, further comprising a write gap between the pole trailing surface and the pole-facing surface, wherein the write gap comprises a first thickness between the first portion of the pole-facing surface and the pole trailing surface, a second thickness between the second portion of the pole-facing surface and the pole trailing surface, and a third thickness between the third portion of the pole-facing surface and the pole trailing surface, wherein the first thickness is substantially constant;

wherein the third thickness is substantially constant and greater than the first thickness; and wherein the second thickness varies between the first thickness and the third thickness.

7. The magnetic write apparatus of claim 6, wherein the third thickness is at least fifteen nanometers greater than the first thickness and not more than fifty nanometers greater than the first thickness.

8. The magnetic write apparatus of claim 6, wherein the first thickness is not more than about twenty-five nanometers.

9. The magnetic write apparatus of claim 5, wherein the pole bevel angle is at least fifteen degrees and not more than forty degrees.

10. The magnetic write apparatus of claim 5, wherein a width of the first portion in the yoke direction is at least twenty nanometers and not more than one hundred nanometers from the media facing surface.

11. The magnetic write apparatus of claim 5, wherein the fourth trailing shield angle is at least forty-five degrees and not more than ninety degrees.

12. The magnetic write apparatus of claim 5, wherein the fourth portion extends at least fifteen nanometers and not more than one hundred nanometers in a direction substantially parallel to the media facing surface.

13. The magnetic write apparatus of claim 5, further comprising a sixth portion that extends between the fourth portion and the fifth portion at a sixth trailing shield angle that is smaller than the fourth trailing shield angle.

14. The magnetic write apparatus of claim 13, wherein a combined width of the fourth portion, the fifth portion, and the sixth portion in the yoke direction is at least one hundred nanometers and not more than four hundred nanometers.

15. The magnetic write apparatus of claim 5, wherein a combined width of the first portion and the second portion in the yoke direction is less than the first distance.

16. The magnetic write apparatus of claim 5, wherein the trailing shield extends no more than six hundred nanometers from the media facing surface.

* * * * *